No. 708,202. Patented Sept. 2, 1902.
F. B. CASE.
CUSHION FRAME FOR BICYCLES.
(Application filed Aug. 6, 1901.)
(No Model.)

WITNESSES=
C. M. Perkins
F. Bissell.

INVENTOR=
Frank B. Case
by Osgood & Davis
his Attys

UNITED STATES PATENT OFFICE.

FRANK B. CASE, OF ROCHESTER, NEW YORK, ASSIGNOR TO RIGGS-SPENCER COMPANY, OF ROCHESTER, NEW YORK, A CORPORATION OF NEW YORK.

CUSHION-FRAME FOR BICYCLES.

SPECIFICATION forming part of Letters Patent No. 708,202, dated September 2, 1902.

Application filed August 6, 1901. Serial No. 71,068. (No model.)

*To all whom it may concern:*

Be it known that I, FRANK B. CASE, a citizen of the United States, and a resident of Rochester, in the county of Monroe and State of New York, have invented certain new and useful Improvements in Cushion-Frames for Bicycles and Like Vehicles, of which the following is a specification.

This invention relates to bicycles and like vehicles having cushion-frames; and it consists in the devices hereinafter described and claimed. Its object is to produce a cushion-frame that obviates objections and difficulties heretofore existing in such frames, and particularly to cushion the action of the parts in both directions, whereby the striking of rigid parts is prevented and all shocks transmitted to the body of the rider of the vehicle are modified by springs.

Figure 1:
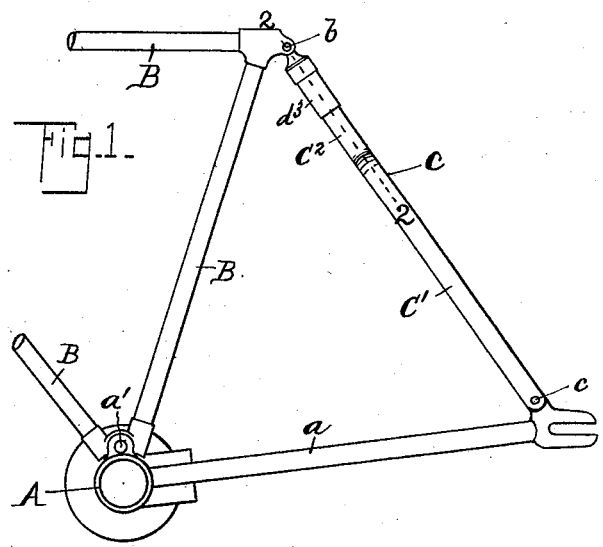
Figure 2:
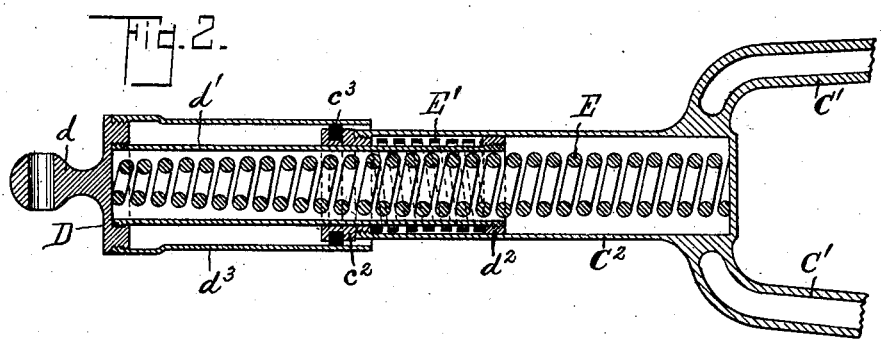

In the drawings, Figure 1 is a side elevation of the rear portion of a bicycle having this invention applied thereto, and Fig. 2 is a longitudinal section on the line 2 2 of Fig. 1.

In Fig. 1, A is the crank-hanger of a bicycle. B B B are parts of a rigid front frame that is hinged at $a'$ to said crank-hanger, so that said rigid front frame may rock or oscillate with reference to the crank-hanger. The rear fork $a$ is rigidly connected to the crank-hanger and through the hinge $a'$ is flexibly connected to the front frame. Between the rear portion of the front frame B and the rear end of the rear fork extends a brace C, which at its ends is pivoted or otherwise flexibly connected to them. The flexible or pivotal connection with the rear fork $a$ is indicated at $c$, and the flexible or pivotal connection with the rigid front frame is indicated at $b$. In the brace C is comprised a collapsible spring-operated portion provided with one spring for extending said portion and another spring for preventing its extension beyond a normal limit. If, for instance, the bicycle passes over an irregular surface, the weight of the rider compresses the principal spring, and the irregularities of the surface cause momentary compressions of the same spring without transmitting the shocks to the body of the rider. The spring acts and reacts in these operations, and occasionally the reaction is such that if the movement of the spring should be limited by rigid stops these stops would strike against each other and cause a disagreeable shock to the body of the rider. Instead, however, of providing a rigid stop for the movement of the main spring by this invention a second spring is introduced into the mechanism, so that said spring is compressed whenever the normal limit of movement of the main spring is approached and opposes the action of the latter spring. The strength of the second spring is properly proportioned to that of the principal spring. One particular construction by which this result is reached is shown in Fig. 2. The rear brace C is conveniently formed with side braces C' C', the upper ends of which are attached to or have an extension consisting of a tubular shell or section $C^2$, within which the main spring E is adapted to rest. The upper end of the tube or shell $C^2$ carries a flange or collar $c^2$, provided, if desired, with a washer or packing $c^3$. The collar $c^2$ has a portion, as shown, inside the shell $C^2$, forming an abutment inside the same. The other section of the cushioning device forming part of the rear brace has a cap D, provided with means, such as a lug $d$, whereby it may be pivoted to the upper rear end of the rigid front frame. From this cap extends a shell or tube $d'$, passing into the shell or tube $C^2$ and having an external flange or collar $d^2$ on its lower end. The cap D may be attached to or integral with said tube or shell $d'$. Around the tube $d'$ and between the flanges or collars $c^2$ and $d^2$ is a coiled spring E', and within the tube $d'$ is an end of the spring E, which latter spring is thus seated in both sections or shells $d'$ and $C^2$ and presses against the bottoms thereof. It will now be seen that upon compression of the spring E the tube $d'$ will collapse or telescope into the tube $C^2$, compressing the spring E, and that the reaction of the spring E tends to extend the tubes $d'$ and $C^2$ with reference to each other and that when such an extension takes place beyond the normal limit the spring E' will be compressed and will resist or oppose the extension of the tubes or shells with reference to each other beyond the normal limit, and when it is so compressed it tends to telescope or contract the two sections of the cushioning device. The spring E is long and of sufficient strength to sustain the weight of the rider and to take up the shocks occurring in riding. The spring E' is weaker than the spring E, because the weaker spring is brought into action only when the stronger spring is approaching the limit of its extension, with consequent decrease of its power.

In order to produce further cushioning in this device, a second shell $d^3$ may be provided, attached to the cap D outside of and concentric with the tube or shell $d'$. The collar $c^2$, with its washer or packing $c^3$, fits air-tight the space between the tubes $d'$ $d^3$, and consequently the air contained in the space between said tubes is compressed whenever the two sections of the cushioning device are collapsed or telescoped into each other, thereby supplementing action of the spring E.

It is not intended to limit this invention to the particular construction described and shown herein.

What I claim is—

1. In a bicycle, the combination of a rigid front frame, a rear-wheel fork flexibly connected thereto at or near the crank-hanger, a brace flexibly connected to the rear portion of the front frame and comprising as one section concentric tubes, a tube fitting air-tight the space between said concentric tubes whereby the two sections may telescope one into the other, a spring within said tubes for extending said sections with reference to each other, a collar upon one tube of each section, and a spring between said collars tending to cause said sections to telescope one into the other when they are extended beyond the normal limit, substantially as described.

2. In a bicycle, the combination of a rigid front frame, a rear-wheel fork flexibly connected to said front frame at or near the crank-hanger, a brace flexibly connected with the rear portion of the rear-wheel fork and having a section flexibly connected to the upper rear portion of the front frame, said brace comprising a cap having two concentric tubes, the inside one being longer than the other, and having an outside collar, and another section having a tube provided with an internal collar and fitting air-tight the space between the said concentric tubes, a coiled spring within the second section and extending within the inner tube of the first section for extending the two sections, and a second coiled spring between said collars for contracting the sections when they are extended beyond the normal limit, substantially as described.

3. In a bicycle, the combination of a rigid front frame, a crank-hanger hinged thereto, a rear-wheel fork rigidly connected to the crank-hanger, a brace flexibly connected to the rear portion of the front frame and to the rear-wheel fork and comprising as one section concentric tubes, and as the other section a tube fitting air-tight the space between the said concentric tubes, said sections containing a spring adapted to extend said sections and a spring for contracting said sections when they are extended beyond the normal limit, substantially as described.

4. In a bicycle, the combination of a rigid front frame, a crank-hanger hinged thereto, a rear-wheel fork rigidly connected to the crank-hanger, a brace flexibly connected to the rear portion of the front frame and to the rear-wheel fork and comprising as one section concentric tubes, a tube fitting air-tight the space between said concentric tubes whereby the two sections may telescope one into the other, a coiled spring within said tubes for extending said sections with reference to each other, a collar upon one tube of each section, and a spring between said collars tending to cause said sections to telescope one into the other when they are extended beyond the normal limit, substantially as described.

5. In a bicycle, the combination of a rigid front frame, a crank-hanger hinged thereto, a rear-wheel fork rigidly connected to the crank-hanger, a brace flexibly connected with the rear portion of the rear-wheel fork and having a section flexibly connected to the upper rear portion of the front frame, said brace comprising as one section a cap having two concentric tubes, the inside one being longer than the other and having an outside collar, and another section having a tube provided with an internal collar and fitting air-tight the space between the said concentric tubes, a coiled spring within the second section and extending within the inner tube of the first section for extending the two sections, and a second coiled spring between said collars for contracting the sections when they are extended beyond the normal limit, substantially as described.

FRANK B. CASE.

Witnesses:
C. M. PERKINS,
F. BISSELL.